March 28, 1950     W. B. HAGGERTY     2,501,898
METHOD OF REFRIGERATING FOOD PRODUCTS
Filed July 29, 1943
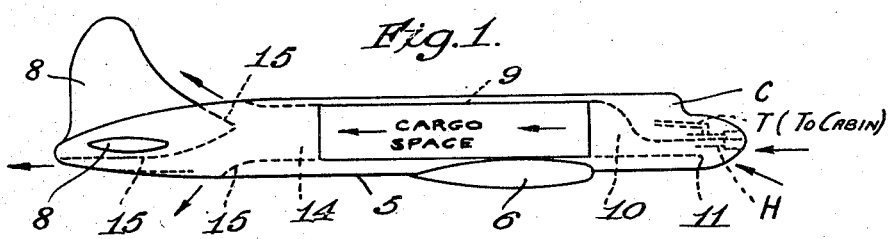
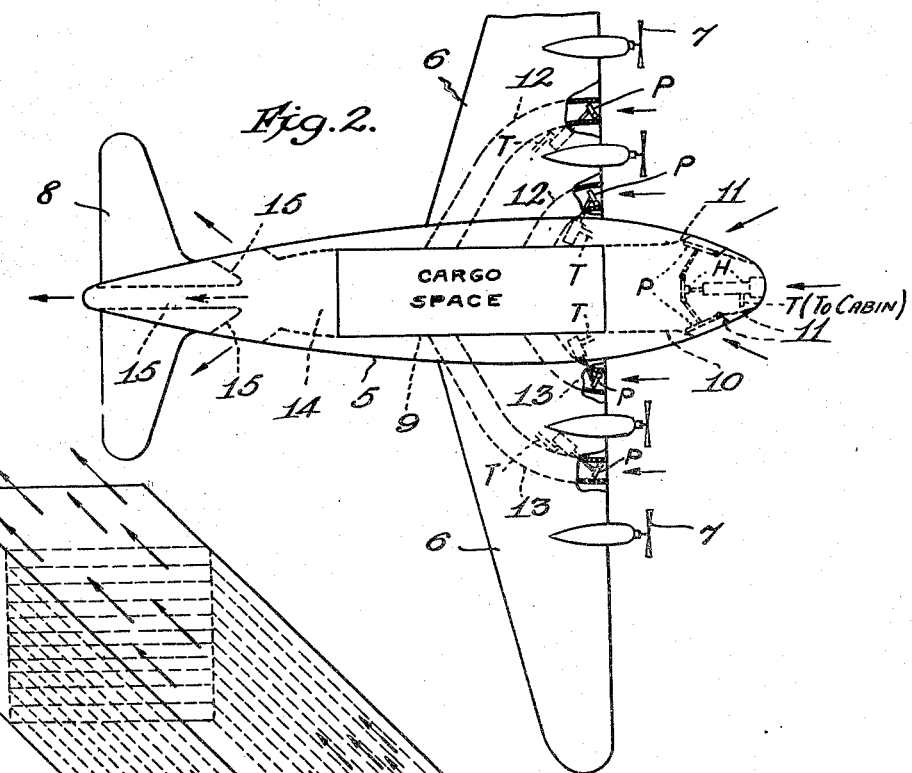
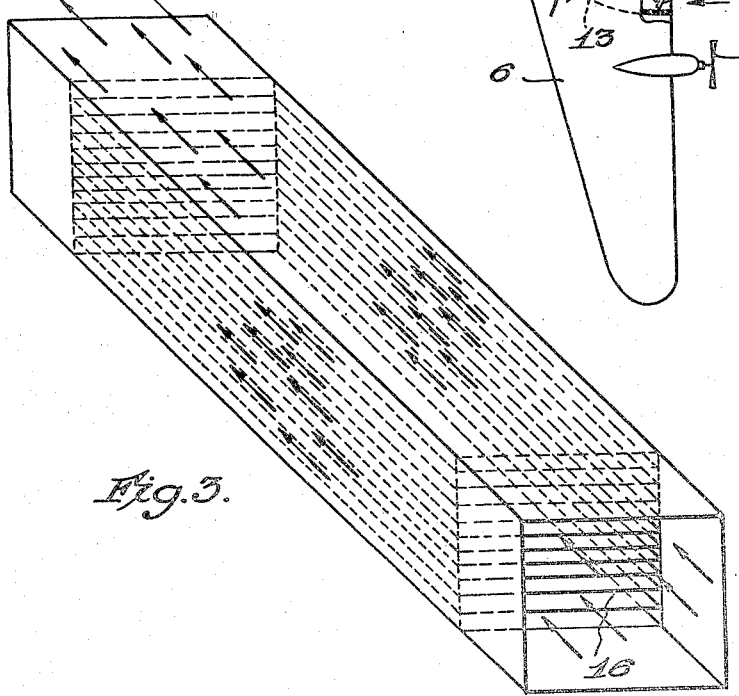
INVENTOR
WILLIAM B. HAGGERTY
BY
ATTORNEY Patented Mar. 28, 1950

2,501,898

UNITED STATES PATENT OFFICE 2,501,898

METHOD OF REFRIGERATING FOOD PRODUCTS

William B. Haggerty, Tampa, Fla., assignor to Tampa Aviation, Inc., Tampa, Fla., a corporation of Florida Application July 29, 1943, Serial No. 496,555

3 Claims. (Cl. 62—1)

The invention relates to the art of the conveying products by aircraft operating at relatively high atmospheric altitudes, and, more particularly, to the art of transport-refrigeration of food products by aircraft operating at relatively high atmospheric altitudes.

It is an object of the invention to provide a novel method involving the use of low atmospheric temperatures as the refrigerant.

Another object of the invention is to provide a novel method of refrigerating food products by means of low atmospheric temperatures at high altitudes.

The invention contemplates further the provision of a novel method of refrigerating food products by passing atmospheric air of low temperature in moving contact with the food products to be refrigerated.

A still further object of the invention is to provide a novel method of refrigerating food products by conveying the food products at high speed in contact with atmospheric air of low temperatures at high altitudes.

Other objects will appear from the description hereinafter and the features of novelty will be pointed out in the claims.

In the accompanying drawing which illustrates examples of equipment for carrying out the invention without defining its limits, Fig. 1 is a diagrammatic side elevation of any airplane designed to carry out the novel method;

Fig. 2 is a diagrammatic plan view thereof, and

Fig. 3 is a perspective view showing shelving which may be used in association with the novel method.

In the preferred form of the novel method, the food products are carried, as cargo, in a carrier as exemplified by an aircraft and conveyed thereby to relatively high altitudes. In traveling along at these high altitudes the food products carried as cargo by the aircraft are subjected to contact with the atmospheric air of low temperatures prevalent at said high altitudes and thereby are refrigerated.

To facilitate the operation of the novel method the atmospheric air at the aforesaid high altitudes may be admitted to the interior of said carrier and conducted into contact with the food products, for instance, by being passed through ducts or inlets into the cargo space. The food products may be quick-frozen or by suitable thermostatic control means the temperature in the cargo space may be controlled to preserve the products while in transit in said aircraft.

Tests indicate that food products may be quickly frozen from a ground temperature of 70° F. to a temperature of minus 40° F. in a cargo aircraft flying at an elevation of from 15,000 to 30,000 feet above sea level at an air speed of approximately 150 miles per hour.

The barometric pressure encountered will range from fifteen inches of mercury at 15,000 feet to eight inches at 30,000 feet as compared to the established base of 29.92 inches at mean sea level. Expressed in terms of indicated vacuum gage pressure, this would mean from fifteen inches to twenty-two inches.

From existing data it appears that the refrigerated air depends to a certain extent on the ground temperature. Thus, a temperature of minus 40° F. would be developed at an elevation of 16,000 feet when the ground temperature is 30° F. above zero; at 20,000 feet when the ground temperature is 50° F., and at 25,000 feet when the ground temperature is 70° F. The ground temperatures of 30°, 50°, and 70° F., for instance, were selected as those that exist at different places during the harvest of those food products that are most popular in the frozen food market at this time.

For purposes of description and explanation it will be assumed that apples, berries, peaches, asparagus and celery are the food products to be refrigerated and that these food products are carried in an airplane of conventional cargo-carrying type flying at an altitude of 25,000 feet at an air speed of 150 miles per hour.

The moisture content of the five food products mentioned above averages about 89.6 percent. To cool the average through 70 to 30° F., freeze the moisture at 32° F. and refrigerate the frozen product to minus 40° F. requires the extraction of 197,000 B. t. u. per 1,000 pounds of food products.

Assuming that the plane carrying the food products is flying in air having a temperature of minus 40° F. for eight hours, the heat will have to be extracted from the products at the rate of about 24,600 B. t. u. per hour or 410 B. t. u. per minute.

One pound of air in warming from minus 45° F. to minus 35° F. (average minus 40° air) can absorb 2.47 B. t u. per pound. 410 B. t. u. divided by 2.47 indicates that 166 pounds of air per minute are required to freeze 1,000 pounds of the food products. This calculation assumes perfect transfer of heat from the product to the cold air.

It is well recognized that air decreases in density as altitude increases; for instance, at an altitude of 15,000 the density is about 22 cubic feet per pound and at 30,000 feet, the density is about 40 cubic feet per pound when the temperature of the air is assumed to be a constant of minus 40° F.

Applying an average altitude density at minus 40° F., it is found that 5,430 cubic feet of air must be passed in contact with the product to freeze it to minus 40° F. per 1,000 pounds of product, assuming perfect transfer. Applying a safety factor of about one-third to this figure results in an air volume of approximately 7,500 (C. F. M.) cubic feet per minute per 1,000 pounds of food products.

Conventional two and one-half pound packages of frozen products have dimensions of 5" x 10" x 2". If fresh food products to be refrigerated in atmospheric air are packed in these existing containers and these packages are placed, for instance, on shelves flatwise so as to offer as much surface as possible to the cold air, 8,000 packages totaling 20,000 pounds can be loaded in an airplane in such a way as to occupy a space 7' x 6' x 25' in the fuselage of the cargo plane and still leave sufficient space between the shelves and the product for passage of the 7,500 C. F. M. without having excessive velocities developed in the air passages.

The air may be admitted to the fuselage and exhausted therefrom in any suitable manner, as for instance through ducts or inlets provided in the aircraft for this purpose. The temperature to be developed depends on the volume of air, and the speed and temperature of the air admitted to the fuselage or its equivalent.

In the preferred form of the novel method the food products are carried, as cargo, in an aircraft as previously stated herein.

For the purpose of illustrating the equipment required in such cases, and without in any way defining the limits of the invention, I refer to the diagrammatic illustrations in Figs. 1, 2 and 3.

The aircraft shown in Figs. 1 and 2 is a cargo plane of any conventional type now existing or of any special design now in use or which may hereafter be developed. While the illustrated equipment for carrying out the novel method is designed with reference to the conventional type of airplanes at present in use, it will be understood that the disclosed and described arrangements may be drastically varied to meet changes in the character and type of aircraft which may be developed in the future.

As shown in Figs. 1 and 2, the airplane comprises the customary fuselage 5 and wings 6 with the conventional propellers 7 driven and controlled in the well-known way, and the usual rudders 8 with the controlling means embodied in the airplane in conformance with existing practice. The airplane further may include the customary accommodations for pilot and crew, as well as any other features or apparatus commonly found in such aircraft or specially designed therefor.

In its diagrammatically illustrated form the airplane includes a cargo space or chamber 9 of predetermined type and dimensions suitably located in the fuselage 5. In its prow the airplane is provided with an inlet air space 10 located interiorly of the fuselage 5 in communication with the forward end of the cargo space or chamber 9. One or more inlet channels 11, the inlet ends of which communicate with the atmosphere at the forward end of said fuselage, lead to said air space 10, as shown in Figs. 1 and 2. Additional inlet channels 12 and 13 may be located in the respective wings 6 with their inlet ends open to the atmosphere at the forward edges thereof as illustrated in Fig. 2. The channels 12 and 13 lead to the cargo space or chamber 9 laterally from opposite directions and communicate therewith at opposite sides substantially in direct opposition, for instance, as shown in Fig. 2. At its rear end the cargo space or chamber 9 is in communication with an outlet air space 14 located interiorly of the fuselage 5 and from which one or more exhaust channels 15 extend into communication with the atmosphere at the tail or rear end of the plane as illustrated in Figs. 1 and 2. If desired, suitable devices may be located in the channels for controlling the volume of atmospheric air admitted to the cargo space or chamber 9 or exhausted therefrom, or both. The devices may be thermostatically operated or automatically controlled in any other suitable manner or said devices may be operated manually at will. As those skilled in the art will readily appreciate, the devices for controlling the volume of atmospheric air admitted to the cargo space or chamber or exhausted therefrom, or both, may be embodied in any suitable form. For example, a shutter, damper, or closure plate P may be mounted in each of the inlet channels (11, 12, 13, 15, etc.) in the usual manner and may be operated by conventional hydraulic devices H to control the volume of atmospheric air being admitted to the inlet channels. An appropriate conduit or flexible tubing T carries the hydraulic fluid under pressure to a suitable control valve located on the instrument panel, for instance, in cabin C within the fuselage 5. Instead of operating shutters, dampers, closure plates, etc. by hydraulic devices, operation may be effected by conventional electric motors as those skilled in the art will readily appreciate. In this manner, the volume of atmospheric air may be automatically or manually controlled from within the fuselage.

For the purpose of supporting the food products to be refrigerated in the cargo space or chamber 9 the latter may be fitted with the rack or shelving shown in Fig. 3.

This rack or shelving comprises a plurality of preferably light shelves 16 suitably supported in the cargo space or chamber 9 preferably so as to be readily removable at will. In the preferred arrangement the shelves 16 correspond substantially in length to the longitudinal dimension of the cargo space or chamber 9 and terminate at their opposite ends at or in proximity to the inlet air space 10 and the outlet air space 14, respectively.

With the aforesaid arrangement the cargo, for instance packages of food products to be refrigerated, is arranged on the shelves 16 in a manner to render all of said packages accessible to the refrigerating air.

As the plane travels through the atmosphere at high altitudes and at predetermined speed the cold atmospheric air will enter the inlet channels 11 into the inlet space 10 as an entering air plenum and pass through the spaces between the shelves 16 to the outlet air space 14. From the latter the exhaust air plenum passes out through the channels 15 to the atmosphere. In its passage through the spaces between the shelves 16 the traveling cold air passes in contact with the packages of food products or other cargo on said shelves 16. As a result the packages of food products or other cargo will be either quickly frozen or otherwise refrigerated as desired.

In some instances the transported food products or other cargo may be frozen or refrigerated prior to being loaded on the plane. In such cases the food products or other cargo would be stacked in the cargo space or chamber 9, for instance, in a mass and not necessarily on the shelves 10, and just sufficient air admitted to said cargo or chamber 9 to maintain and preserve the food products or other cargo in the pre-frozen or pre-refrigerated state during transport to its destination. In such event the shelving shown in Fig. 3 or its equivalent would not be used in the cargo space or chamber 9.

With the novel method an aircraft may depart from a point of production with a cargo of fresh vegetables, meat, poultry or fruit and while in transit utilizes the aforesaid method of refrigeration by means of the encountered atmospheric air to freeze or preserve the product, and arrive at its destination with a completely processed quick-frozen cargo of food products or one that has been maintained at temperatures predetermined for its preservation while in transit.

The novel method of refrigerating food products avoids the necessity for complicated apparatus and conserves time and effort with consequent economic advantages, and at the same time provides maximum efficiency in the processing of said food products.

Although the present invention has been described in conjunction with a preferred embodiment, it is to be understood that modifications and variations may be resorted to without departing from the spirit and scope of the invention, as those skilled in the art will readily understand. I do not desire to be limited to the exact details of the construction shown and described, for obvious variations and modifications will occur to those persons skilled in the art.

I claim:

1. In the art of conveying products by aircraft at relatively high atmospheric altitudes, the improved method which comprises admitting into said aircraft at said high altitudes atmospheric air of low temperature in a plurality of streams laterally from opposite sides of a cargo chamber of said aircraft substantially in direct opposition to pass in heat exchange relation with said products interiorly of said cargo chamber during transit to refrigerate the same, controlling the volume of atmospheric air so admitted and thereby controlling the refrigerated temperature of cargo chamber of the aircraft, and expelling said atmospheric air from said aircraft after refrigerating said products.

2. In the art of conveying products by aircraft at relatively high atmospheric altitudes, the improved method which comprises admitting into said aircraft at said high altitudes atmospheric air of low temperature in a plurality of streams laterally from opposite sides of a cargo chamber of said aircraft substantially in direct opposition to pass in heat exchange relationship with said products interiorly of said cargo chamber during transit to refrigerate the same, controlling the volume of atmospheric air so admitted and thereby controlling the refrigerated temperature of the interior of the cargo chamber of the aircraft, and directing said atmospheric air from said aircraft in a plurality of streams after refrigerating said products.

3. In the art of conveying products by aircraft at relatively high atmospheric altitudes, the improved method which comprises admitting into the interior of said aircraft at said high altitudes atmospheric air of low temperature in a plurality of streams from the front and laterally from opposite sides of a cargo chamber substantially in direct opposition to pass in heat exchange relationship with said products in said cargo chamber during transit to refrigerate the same, controlling the volume of atmospheric air so admitted and thereby controlling the refrigerated temperature of the cargo chamber of the aircraft, and directing said atmospheric air from the aircraft after refrigerating said products.

WILLIAM B. HAGGERTY.

REFERENCES CITED

The following references are of record in the file of this patent:

UNITED STATES PATENTS

| Number | Name | Date |
| --- | --- | --- |
| 48,457 | Somes | 1865 |
| 260,011 | Fennerty | 1882 |
| 1,427,872 | Verville | Sept. 1922 |
| 2,092,655 | Page, Jr. | Sept. 7, 1937 |
| 2,237,257 | Finnegan | Apr. 1, 1941 |
| 2,412,110 | Williams | Dec. 3, 1946 |
| 2,447,665 | Protzeller | Aug. 24, 1948 |

FOREIGN PATENTS

| Number | Country | Date |
| --- | --- | --- |
| 510,539 | France | 1919 |
| 887,267 | France | Nov. 9, 1943 |

OTHER REFERENCES

Air Conditioning and Refrigeration News, Aug. 2, 1943, page 5, col. 2.

Air Conditioning and Refrigeration News, Oct. 11, 1943, page 9, col. 1.

Bulletin No. 627, U. S. Dept. of Agr. Aug. 1938, page 11.